United States Patent Office 3,660,571
Patented May 2, 1972

3,660,571
DISEASE CONTROL COMPOSITION
FOR SILKWORMS
Reijiro Kodama, Kyoto-fu, Yugoro Nakasuji, Toyonaka, and Kosaku Imanishi, Tokyo, Japan, assignors to Takeda Chemical Industries, Ltd., Osaka, Japan
No Drawing. Filed Mar. 26, 1969, Ser. No. 810,802
Claims priority, application Japan, Mar. 28, 1968, 43/20,288; June 12, 1968, 43/40,491
Int. Cl. A61k 27/00
U.S. Cl. 424—181
10 Claims

ABSTRACT OF THE DISCLOSURE

Silkworm diseases, and more especially flacherie, are controlled by a composition consisting essentially of silkworm feedstuff and a minor but effective amount of triphenylmethane dyestuff with or without a minor amount of macrolide antibiotic and of fructosazine.

This invention relates to disease control compositions for silkworms.

Silkworm diseases are serious threats to sericulture, and flacherie, in particular, has been playing great havoc.

Besides being bacterial, flacherie in silkworms may be viral, and generally breaks out more frequently in summer to late fall than in the spring, and this apparently accounts, in a large measure, for the nation-wide poor yields in the summer to fall season. To this day, no direct control measure has been known and only some indirect methods, including the disinfection of the rearing room and rearing equipment, are practiced today. To those concerned with sericulture, therefore, it has been a cherished desire to have a direct control method for the prevention of viral flacherie.

A principal object of the present invention is to provide compositions for directly controlling diseases of silkworms and especially flacherie.

According to the present invention, the addition of triphenylmethane dyestuff(s) to feedstuff for silkworms serves to remarkably control diseases of the silkworms, which consume such feedstuff. Further, the combination of triphenylmethane dyestuff(s) with macrolide antibiotic(s) plays a synergistic effect for controlling the diseases. Futhermore, the incorporation of glucosamine derivative also gives some controlling effect against diseases of silkworms in cooperation with triphenylmethane dyestuff(s) and/or macrolide antibiotic(s).

Accordingly, the use of the compositions of the present invention achieves the aforesaid object.

As triphenylmethane dyestuff employed in the present invention, there are exemplified, for example, malachite green, crystal violet, methyl violet, gentian violet, brilliant green, etc. as well as their salts, such as the hydrochlorides, sulfates, oxalates, zins double salts and the like. According to the present invention, one or more of the triphenylmethane dyestuffs are fed to silkworms in the composition form of silkworm-feed or silkworm-feed additives. The silkworm-feed as mentioned above contains triphenylmethane dyestuff(s) and basic components of an artificial feed for silkworms. The amount of triphenylmethane dyestuff to be added is about 0.00005 to 0.01%, more advantageously about 0.001 to 0.005%, relative to the artificial feedstuff (wet basis) or mulberry leaves. But these amounts vary with, for example, kinds of the feedstuff for the silkworms or manner and conditions for preparing the feedstuff. Artificial feedstuff for silkworms, with which triphenylmethane dyestuff is not incorporated, is disclosed in, for example, French Pats. No. 1,392,752, No. 1,392,707, No. 1,394,330 and No. 1,468,486, U.S. Pats. No. 3,275,446 and No. 3,230,930, etc. That is to say, such feedstuff contains such ingredients as mulberry leaf powder, the biting factor which stimulates silkworms to bite (e.g. β-sitosterol with or without flavonoids such as quercetin, morin, rutin, isoquercitrin), the swallowing factor which stimulates them to bite and swallow continuously (e.g. cellulose powder), polyhydroxycarboxylic acid or its derivatives (e.g. chlorogenic acid, caffeic acid, gallic acid, gentisic acid, homogentisic acid, resorcylic acid, quinic acid, uronic acid, protocatechuic acid, etc.); hydroxybenzaldehyde (e.g. protocatechualdehyde, 3,4,5 - trihydroxybenzaldehyde, 2,3-dihydroxybenzaldehyde, 2,4 - dihydroxybenzaldehyde, 4 - hydroxybenzaldehyde, 2,4,6 - trihydroxybenzaldehyde, etc.), choline and its derivatives, nucleic acid or its derivatives, sugar, inorganic phosphate, inorganic silicate, inositol, etc. As components of such artificial feedstuff, which are helpful for the growth of silkworms, there can be used, for example, agar agar, sodium carboxymethylcellulose methylcellulose, alginic acid; soybean powder, parched soybean flour, defatted soybean powder, bean curd, dried fermented soybean powder, defatted and dried bean paste; cereal flour such as rice flour, barley flour, wheat flour, etc.; yeast products such as dry yeast, yeast extract, extracted fluid of yeast, extracted yeast cake; straw ashes; fish meal, animal or plant proteins; amino acids or their salts; vitamins (e.g. pantothentic acid, nicotinic acid, vitamin $B_1$, vitamin $B_2$, vitamin $B_6$, vitamin $B_{12}$, vitamin C, vitamin D, biotin, folic acid, vitamin K, vitamin E, vitamin P, nositol, orotic acid, α-lipoic acid, etc.); inorganic salts (e.g. calcium carbonate, sodium carbonate, sodium hydrogencarbonate, sodium chloride); honey or its products; pectin; enzymes (e.g. protease, amylase, pectinase, cellulase lipase); dihydrostreptomycin; chloramphenicol; sulfa drugs, furan derivatives; glucuronic acid or its salt, amine, or ester, and attracting factor which attracts silkworms (terpenes such as citral, linalyl acetate, linalol, terpinyl acetate). Components of these silkworm feedstuff are kneaded with water, steamed, made in a proper form and then fed to silkworms.

Besides, the triphenylmethane dyestuffs can be fed to silkworms in the form of their feedstuff which is used together with mulberry leaves or an artificial feedstuff. These additives consist of triphenylmethane dyestuffs(s) and, if necessary, one or more carriers which are selected from the components of the artificial feedstuff mentioned above and the artificial feedstuff itself, and used in the form of plates, rods, flakes, granules, powder, wettable powder, solution, emulsion, etc. The concentration of triphenylmethane dyestuff in said additives advantageously falls in the range of 0.001–0.005%. The additive can, for instance, be prepared by kneading triphenylmethane dyestuff(s) with an artificial feedstuff which is used as a carrier, in such a proportion as about 1 to 2γ per gram of the carrier (dry basis). Or, the additive may be a liquid preparation, e.g. an aqueous solution containing about 0.4 to 40γ/ml. of triphenylmethane dyestuff. And when the additive prepared in the foregoing manner is added to an artificial feedstuff or mulberry leaves, it is recommended to arrange so that every 900 square centimeters of the feedstuff will contain in even distribution about 2 to 3 grams of the additive.

The disease controlling composition of the present invention can contain further components, e.g. one or more of macrolide antibiotics or fructosazine.

The macrolide antibiotics which contain a multi-membered lactone moiety and an aminosugar moiety in the molecule, are exemplified by oleandomycin, leucomycin, erythromycin, pikromycin, triacetyloleandomycin, carcomycin, spiramycin, tylosin, tertiomycin etc.

The amount of said macrolide antibiotic to be added to the present compositions is about 0.001 to about 0.01% and more advantageously, about 0.0005 to about 0.005%. The amount of said fructosazine to be used is about 0.01 to about 5.0%, more advantageously, about 0.05 to about 1%.

The macrolide antibiotics are found, when used with the triphenylmethane dyestuffs in combination, to show a remarkable synergistic effect to the diseases of silkworms, especially to flacherie. The mechanism of such synergistic effect may be as follows:

The present inventors did considerable work to elucidate the pathopoietic process of flacherie using certain pathogenic viruses and bacteria, in which work we first studied the pathopoietic process by administering a viral suspension of a scarcely pathogenic order and very weakly pathogenic bacterial strains, either independently or in combination, to silkworm larvae that have been raised on artificial feedstuff under germ-free conditions. This preliminary study resulted in the finding that if the larvae are inoculated with a virus for 24 hours in their third or fourth instar and, then, with G-27 strain (an intermediate strain between *Streptococcus faecalis* and *Streptococcus faecium*) for 4 hours in their fifth instar, or with the virus and bacterial strain concurrently in their fifth instar, there is a synergistic effect which accounts for a high incidence of flacherie. It was thus confirmed, for the first time, that the viral and bacterial agents cooperate with each other to cause flacherie. Thus, it can be said that a combination of triphenylmethane derivatives which can control the flacherie virus and macrolide antibiotics which can control the flacherie bacteria shows a synergistic effect. Meanwhile, among the pathogens responsible for viral flacherie, there are cytoplasmic polyhedrosis viruses (CPV), flacherie viruses (FV) and others, and the triphenylmethane dyestuffs are not so effective against viruses except cytoplasmic polyhedral viruses. The glucosamine derivatives mentioned above, on the other hand, can be effective against any kind of flacherie viruses, though not 100% satisfactorily and cooperate with triphenylmethane dyestuffs, and/or macrolide antibiotics. This is confirmed by the following tests. The basic feedstuff employed in these tests contains components listed below:

| | Grams |
|---|---|
| Mulbery leaf powder | 2.0 |
| Cellulose powder | 3.5 |
| Defatted soybean powder | 1.5 |
| Cane sugar | 1.0 |
| Starch | 1.5 |
| Wesson's mineral [1] | 0.15 |
| Vitamin mixture [2] | 0.04 |
| β-sitosterol | 0.05 |
| Vitamin C | 0.05 |
| Inositol | 0.05 |
| $K_2HPO_4$ | 0.05 |
| Acetylcholine | 0.01 |

Water—16 ml.
   (1–3 instar—16 ml.)
   (4-instar—15 ml.)
   (5-instar—14 ml.)

[1] Consisting of NaCl, KCl, $KH_2PO_4$, $Ca_3(PO_4)_2$, $CaCO_3$, $FePO_4$, $MgSO_4$, $KAl_2(SO_4)_3 \cdot 12H_2O$, $CuSO_4$, $MnSO_4$ and KI in the weight ratio of 52.5:60.0:15.5:74.5:10.5:7.4:45.0-0.05:0.2:0.1:0.03.
[2] Consisting of vitamin $B_1 \cdot HCl$, vitamin $B_2$, vitamin $B_6$, nicotinic acid, calcium panthothenate, folic acid, biotin, and vitamin Bt in the weight ratio of 10:10:10:20:20:2:2:10.

TEST I (I) Rearing

The silkworms are reared by the basic feedstuff mentioned above under germ-free conditions. The amount of the feedstuff and the spreading area are decided as shown in the following table:

| Instar | First | Second | Third | Fourth | Fifth |
|---|---|---|---|---|---|
| Amount of feedstuff in dry weight per one silkworm (g.) | 0.01 | 0.05 | 0.3 | 0.5 | 4 |
| Area per one silkworm (cm.$^2$) | 0.3 | 0.8 | 2.1 | 5.5 | 21.0 |

(II) Test method

The test silkworms are reared with the feedstuff incorporated with malachite green oxalate or brilliant green oxalate during the first 24 hours of the third instar, then in the following 24 hours with the feedstuff incorporated with *cytoplasmic polyhedrosis* virus (CPV) and thereafter with the feedstuff incorporated with malachite green oxalate or brilliant green oxalate.

(III) Results

TABLE I

| Test group | | | | Number of test silkworm larvae | Number of dead larvae 5-instar | In cocoon | | Mortality ratio, percent |
| | | | | | | Number of healthy pupae | Number of dead pupae | |
|---|---|---|---|---|---|---|---|---|
| No. | 3-instar | 4-instar | 5-instar | | | | | |
| 1 | CPV/MGO | MGO | MGO | 10 | 0 | 10 | 0 | 0 |
| 2 | CPV/BG | BG | BG | 10 | 0 | 10 | 0 | 0 |
| 3 | MGO | MGO | MGO | 10 | 0 | 10 | 0 | 0 |
| 4 | BG | BG | BG | 10 | 0 | 10 | 0 | 0 |
| 5 | CPV | | | 10 | 4 | 5 | 1 | 50 |

Note.—In the above Table I CPV=3 × 10$^7$ polyhedra of CPV added per 5 grams of feedstuff; MGO=2γ of malachite green oxalate per gram of feedstuff (as per Example 3); BG=2γ of brilliant green oxalate per gram of feedstuff (as per Example 3).

TEST 2

In a similar manner and operation as in the preceding Test I, virus, and triphenylmethane dyestuff(s), are fed to the test silkworms. In the fifth instar, the feedstuff incorporated with triphenylmethane dyestuffs and leucomycin are fed to the silkworms for the first 24 hours, then the feedstuff incorporated with bacteria for the following 24 hours and thereafter the feedstuff incorporated with triphenylmethane dyestuff(s).

The resulting are summarized in the following Table II.

TEST 4

In a similar manner as in the preceding Tests I and II, virus, bacterial strains, fructosazine and macrolide antibiotics are fed to the test-silkworms.

TABLE II.—SILKWORM CONTROL EFFECTS ON GERM-FREE-SILKWORMS

| No. | Test group 3-instar | Test group 4-instar | Test group 5-instar | Test larvae, in heads | Number of dead larvae, in heads | Healthy larvae, in heads | Mortality ratio (percent) |
|---|---|---|---|---|---|---|---|
| 1 | MGO / CPV | MGO | MGO+LM / B | 10 | 0 | 10 | 0 |
| 2 | BG / CPV | BG | MG+LM / B | 10 | 0 | 10 | 0 |
| 3 | MGO / CPV | MGO | MGO / B | 10 | 6 | 4 | 60 |
| 4 | CPV | | LM / B | 10 | 3 | 7 | 30 |
| 5 | CPV | | | 10 | 2 | 8 | 20 |
| 6 | | | B | 10 | 2 | 8 | 20 |
| 7 | CPV | | B | 10 | 9 | 1 | 90 |
| 8 | MGO | MGO | MGO+LM | 10 | 0 | 10 | 0 |
| 9 | BG | BG | BG+LM | 10 | 0 | 10 | 0 |

NOTE.—CPV=fed cytoplasmic polyhedral disease virus ($3 \times 10^5$ polyhedra/5 grams feed); B=fed G-27 strain ($5 \times 10^3$ particles/5 grams feed). BG plus LM=fed silkworm disease control feed of Example 1; MGO plus LM=fed silkworm disease control feed of Example 2; BG=fed basic ratio of Example 1, plus 2 γ/gram brilliant green. MGO=fed basic ration of Example 1, plus 2 γ/gram malachite green oxalate; LM=fed basic ration of Example 1, plus 10 γ/gram leucomycin; Test silkworms=Gunko X Banri.

TEST 3

In a similar manner as in the preceding Tests I, and II, virus and bacteria, triphenylmethane dyestuff, and macrolide antibiotics listed in Table III, are fed to the test-silkworms except the silkworms are reared with mulberry leaves.

The results are summarized in the following Table III.

TABLE III.—DISEASE CONTROL EFFECTS ON MULBERRY LEAF-FED SILKWORMS

| No. | Test group 3-instar | Test group 4-instar | Test group 5-instar | Test larvae, in heads | Number of dead larvae in heads | Healthy larvae, in heads | Mortality ratio (percent) |
|---|---|---|---|---|---|---|---|
| 1 | M / CPV | M / B | M | 20 | 5 | 15 | 25 |
| 2 | M / B | M / CPV | M | 20 | 0 | 20 | 0 |
| 3 | MGO / CPV | MGO / B | MGO | 20 | 12 | 8 | 60 |
| 4 | M¹ / B | M¹ / CPV | M¹ | 20 | 6 | 14 | 30 |
| 5 | CPV | B | | 20 | 20 | 0 | 100 |
| 6 | B | CPV | | 20 | 20 | 0 | 100 |
| 7 | CPV | | | 20 | 9 | 11 | 45 |
| 8 | | CPV | | 20 | 2 | 18 | 10 |
| 9 | B | | | 20 | 1 | 19 | 5 |
| 10 | | B | | 20 | 2 | 18 | 10 |
| 11 | M | M | M | 20 | 0 | 20 | 0 |

NOTE.—CPV=4 ml. (milliliters) of a viral suspension, $10^4$ polyhedra/ml., per 8 g. (grams) mulberry leaves are fed to 3-instar larvae on the second day of the said instar, or 12.5 ml. of a viral suspension, $10^5$ polyhedra/ml., per 25 g. mulberry leaves to 4-instar larvae on the second day of the same stage, at 25° C. for 24 hours, each. B=A mixture (McFarland No. 3) of E₅ (ATCC 15335, this strain is closely related to *Streptococcus faecalis*) and E₁₅ (this strain is closely related to *Serratia piscatorum*) is fed to 3-instar larvae on the second day of the said instar or 3-instar larvae on the second day of the said instar, at 25° C. for 24 hours each; M=fed the silkworm disease control agent of Example 6; M¹=fed the control agent of Example 6, less malachite green oxalate; Test silkworms=Shungetsu X Hosho, late-fall silkworms.

The results are summarized in the following Table IV.

TABLE IV

| No. | Test group 3-Instar | Test group 4-Instar | Test group 5-Instar | Test larvae in heads | Mortality ratio (percent) |
|---|---|---|---|---|---|
| 1 | FV | | | 10 | 10 |
| 2 | | | B | 10 | 20 |
| 3 | F | | B | 10 | 80 |
| 4 | {Fs, FV} | {Fs} | Fs | 10 | 0 |
| 5 | {Fs, FV} | {Fs} | {B, Fs} | 10 | 40 |
| 6 | FV | | {LM, B} | 10 | 20 |
| 7 | {Fs, FV} | {Fs} | {Fs plus LM, B} | 10 | 10 |
| 8 | NPV | | | 10 | 30 |
| 9 | | | B | 10 | 20 |
| 10 | NPV | | B | 10 | 70 |
| 11 | {Fs, NPV} | {Fs} | Fs | 10 | 10 |
| 12 | {Fs, NPV} | {Fs} | {Fs, B} | 10 | 60 |
| 13 | NPV | | {LM, B} | 10 | 20 |
| 14 | {Fs, NPV} | {Fs} | {Fs plus LM, B} | 10 | 0 |
| 15 | CPV | | | 10 | 60 |
| 16 | {Fs, CPV} | {Fs} | Fs | 10 | 20 |
| 17 | | | | 10 | 0 |

NOTE.—FV=Flacherie virus ($3\times10^{-7}/5$ g. fed for 24 hours); NPV= Nuclear polyhedrosis virus ($3\times10^3$ polyhedra/5 g. fed for 24 hours); CPV=Cytoplasmic polyhedrosis virus ($3\times10^7$ polyhedra/5 g. fed for 24 hours); B=$3.1\times10^2$ cells/5 g. fed for 4 hours; Fs=fed basic feedstuff of Example 1, plus 2 mg./g. fructosazine; LM=fed basic feedstuff of Example 1, plus $10\gamma$/g. leucomycin. Test silkworms=Gunko X Banri.

The following examples show presently preferred embodiments of this invention but are not to be construed as restrictive. It is to be understood that the following examples are solely for the purpose of illustration and not for limitation of this invention, and that variations may be resorted to without departing from the spirit and scope of this invention. In the example, parts by weight bear the same relation to parts by volume as do grams to milliliters.

EXAMPLE 1

A silkworm disease control agent is prepared by mixing 100 parts by weight of distilled water with 0.004 part by weight of brilliant green.

EXAMPLE 2

A silkworm disease control agent is prepared by mixing 150 parts by weight of defatted soybean powder thoroughly with 0.005 part by weight of malachite green.

EXAMPLE 3

Two-hundred parts by weight of mulberry leaf powder, 150 parts by weight of defatted soybean powder, 35 parts by weight of cellulose powder, 15 parts by weight of potato starch, 10 parts by weight of cane sugar, 0.5 part by weight of $\beta$-sitosterol, 0.4 part by weight of vitamin mixture, 1 part by weight of Wesson's minerals, 0.5 part by weight of inositol, 0.5 part by weight of potassium monohydrogen phosphate and 0.05 part by weight of choline chloride are kneaded together, using twice the amount of water. The resulting basic feed is further kneaded with 0.0025 part by weight of brilliant green oxalate or malachite green to produce a flacherie control feed.

EXAMPLE 4

Two-hundred parts by weight of mulberry leaves, 150 parts by weight of defatted soybean powder, 35 parts by weight of cellulose powder, 15 parts by weight of potato starch, 10 parts by weight of cane sugar, 0.5 part by weight of $\beta$-sitosterol, 0.4 part by weight of vitamin mixture, 1 part by weight of Wesson's minerals, 0.5 part by weight of inositol, 0.5 part by weight of dipotassium hydrogen phosphate, and 0.05 part by weight of choline chloride are kneaded together using twice the amount of water. To the resulting basic feed, are added brilliant green and leucomycin in the respective ratios of $2\gamma$/gram and $10\gamma$/gram in this order. The mixture is blended well to prepare a silkworm disease control feed.

EXAMPLE 5

To the basic feed of Example 1, malachite green-oxalate and leucomycin are added in the respective ratios of $2\gamma$/g. and $10\gamma$/g. in this order, followed by thorough blending to prepare a silkworm disease control feed.

EXAMPLE 6

0.04 part by weight of malachite green oxalate, 0.04 part by weight of leucomycin, 0.088 part by weight of fradiomycin and 0.128 part by weight of dihydrostreptomycin are made up with soluble starch to a total weight of 10 parts, followed by thorough blending to prepare a silkworm disease control agent. To administer the agent to silkworm larvae, 10 parts by weight of the agent is dissolved in 1000 parts by volume of water and the resulting solution is sprayed over mulberry leaves at the rate of 170 parts by volume per kilogram of the mulberry leaves.

EXAMPLE 7

Twenty parts by weight of mulberry leaves, 15 parts by weight of defatter soybean powder, 35 parts by weight of cellulose powder, 15 parts by weight of potato starch, 10 parts by weight of cane sugar, 0.5 part by weight of $\beta$-sitosterol, 0.4 part by weight of vitamin mixture, 1 part by weight of Wesson's minerals, 0.5 part by weight of inositol, 0.5 part by weight of dipotassium hydrogen phosphate, 0.05 part by weight of choline chloride and 0.1 part by weight of dihydrostreptomycin are kneaded together using twice the amount of water. To the resulting basic feed, 0.5 part by weight of fructosazine, 0.0001 part by weight of leucomycin and 0.0002 part by weight of brilliant green are added. The mixture is blended well to prepare a silkworm disease control feed.

What is claimed is:

1. A flacherie control composition for silkworms containing a triphenyl-methane dyestuff selected from the group consisting of malachite green, crystal violet, methyl violet, gentian violet, and brilliant green in an amount of about 0.00005 to about 0.01% by weight, the carrier residue being artificial feed for silkworms or mulberry leaves.

2. The composition of claim 1 wherein said residue comprises an effective amount of a biting or swallowing factor for silkworms.

3. A disease control composition for silkworms according to claim 1, wherein triphenylmethane dyestuff is malachite green.

4. A disease control composition for silkworms according to claim 1, wherein triphenylmethane dyestuff is gentian violet.

5. A disease control composition for silkworms according to claim 1, wherein triphenylmethane dyestuff is brilliant green.

6. A flacherie control composition for silkworms containing a triphenylmethane dyestuff selected from the group consisting of malachite green, crystal violet, methyl violet, gentian violet and brilliant green in an amount of about 0.00005 to 0.01% by weight, and a macrolide antibiotic selected from the group consisting of oleandomycin, triacetyl-oleandomycin, leucomycin, carbomycin, erythromycin, pikromycin, spiramycin, tylosin and tertiomycin in an amount of about 0.0001 to about 0.01% by weight, the carrier residue being artificial feed for silkworms or mulberry leaves.

7. A disease control composition for silkworms according to claim 6, wherein macrolide antibiotic is oleandomycin.

8. A disease control composition for silkworms according to claim 6, wherein macrolide antibiotic is leucomycin.

9. A disease control composition for silkworms according to claim 6, wherein macrolide antibiotic is pikromycin.

10. A flacherie control composition for silkworms containing a triphenylmethane dyestuff selected from the group consisting of malachite green, crystal violet, methyl violet, gentian violet and brilliant green in an amount of about 0.00005 to about 0.01% by weight, a macrolide antibiotic selected from the group consisting of oleandomycin, triacetyloleandomycin, leucomycin, carbomycin, erythromycin, pikromycin, spiramycin, tylosin and tertiomycin in an amount of about 0.0001 to about 0.01% by weight, and fructosazine in an amount of about 0.01 to 5.0% by weight, the carrier residue being artificial feed for silkworms or mulberry leaves.

References Cited

UNITED STATES PATENTS 2,973,299  2/1961  Coffin  424—330

SAM ROSEN, Primary Examiner

U.S. Cl. X.R.

424—180, 330